United States Patent [19]

Cooper

[11] 4,173,189

[45] Nov. 6, 1979

[54] BOILER COLD START USING PULVERIZED COAL IN IGNITOR BURNERS

[75] Inventor: Thomas H. Cooper, Windsor, Conn.

[73] Assignee: Combustion Engineering, Inc., Windsor, Conn.

[21] Appl. No.: 865,412

[22] Filed: Dec. 29, 1977

Related U.S. Application Data

[63] Continuation of Ser. No. 760,882, Jan. 21, 1977, abandoned.

[51] Int. Cl.² .............................................. F23K 3/02
[52] U.S. Cl. ..................................... 110/106; 110/263
[58] Field of Search ........... 110/263, 264, 265, 101 R, 110/106

[56] References Cited

U.S. PATENT DOCUMENTS

| 1,628,609 | 5/1927 | Newhouse | 110/106 |
| 2,159,849 | 5/1939 | Graemiger | 110/106 |
| 2,841,102 | 7/1958 | Marshall | 110/106 |
| 3,393,965 | 7/1968 | Vaughan | 110/264 |
| 3,395,657 | 8/1968 | Schuss | 110/101 |
| 3,400,921 | 9/1968 | Hemker | 110/264 |
| 3,602,164 | 8/1971 | Reintjes | 110/106 |
| 3,788,796 | 1/1974 | Krippene et al. | 110/264 |

Primary Examiner—Kenneth W. Sprague

[57] ABSTRACT

An ignition, warm-up and low-load-stabilization system for furnaces fired by pulverized coal. In conjunction with a system in which pulverized coal is sent directly from a coal mill to a load-bearing nozzle and in which combustion air is brought to the nozzles from an air preheater that uses hot furnace gases to warm the combustion air, ignitor nozzles are provided that are supplied by pipes bearing coal from which the drying air has been separated. Combustion air for the ignitor nozzles is heated by an independent heat source that heats the combustion air or a portion thereof to a temperature higher than that of the air supplied by the air preheater. Such a coal-fired ignitor burner can replace oil or gas-fired ignitors and warm-up guns and thereby reduce the amount of oil or gas used in ignition, warm-up, and low-load stabilization.

26 Claims, 3 Drawing Figures

BOILER COLD START USING PULVERIZED COAL IN IGNITOR BURNERS

CROSS-REFERENCE TO RELATED APPLICATIONS

This application is a continuation of application Ser. No. 760,882 filed Jan. 21, 1977, now abandoned.

BACKGROUND OF THE INVENTION

The present invention relates to the field of coal-fired furnaces. It relates particularly to a furnace that can use coal for ignition, warm-up, and low-load stabilization.

It is sometimes desirable to use coal rather than gas or oil in electrical generating facilities. In those situations, the utility will naturally have a coal-fired unit built rather than an oil-fired unit. However, even in coal-fired units, substantial quantities of gas or oil are often used. In a typical coal-fired unit, coal to be burned in the furnace is dried and pulverized in a coal mill and delivered directly from the coal mill to the load-carrying coal nozzles in the furnace. Operation of the coal mills requires that heated air be supplied to the mills for drying and conveying the coal. This air is supplied by a forced-draft fan that forces the air through an air preheater, a device that uses the hot products of combustion in the furnace to preheat the air. This preheated primary air, the air used for drying and conveying coal, is delivered with the coal to the coal nozzles and used to support combustion. The primary air is typically not sufficient in quantity to support combustion of all the coal, so secondary air is brought directly from the air preheater to the furnace to supply the rest of the air needed for combustion. The coal thus supplied with air is caused to burn due to ignition energy from the primary air, the secondary air, the heat in the coal itself, radiation and conduction from flame in the furnace, and radiation from furnace walls.

It is to be noted that almost all of these combustion energy sources presuppose that the furnace has already been operating, and, in the large furnaces used in power generation, it presupposes that the furnace has been operating for a fairly long time. Accordingly, in order to cause and sustain combustion of the coal, it is necessary to use an auxliary fuel for warming up the furnace walls, for providing ignition flame, and for warming up the air preheater. This is usually the function of oil- or gas-fired ignitors and warm-up guns.

In a typical installation, a relatively high-capacity oil burner is started by an ignitor, and this starts the process or warming up the furnace walls and the heat-exchange surfaces of the air preheater. This can take some time, and the use of 70,000 gallons of oil in a 900-megawatt unit for one startup alone is not uncommon. In addition, there is considerable capital expense involved in providing the hardware that is used for supplying oil. Once the furnace has been brought up to temperature, the coal nozzles are ignited by oil- or gas-fired ignitors or by the warm-up guns themselves.

The use of auiliary fuel is not necessarily over when the coal nozzles have started to supply coal. At higher boiler loads—that is, when the amount of coal supplied by the nozzles is great—the furnace can typically maintain stable combustion of the pulverized coal. However, when the load goes down and the coal supply is thereby decreased, the stability of the pulverized coal flame is also decreased, and it is therefore common practice to use the ignitors or warm-up guns to maintain flame in the furnace, thus avoiding the accumulation of unburned coal dust in the furnace and the associated danger of explosion.

All of these functions of the oil- or gas-fired burners rely on the greater ease of ignition of these fuels; less heat is required, from whatever source, to liberate the volatiles and thereby initiate or sustain combustion. Conversely, the greater difficulty encountered in igniting coal is the reason why it has typically not been used for the ignition, warm-up and low-load-stabilization functions. An incidental advantage of oil and gas that also contributes to the greater desirability of their use for these functions is that it is possible to supply them in relatively small pipes, thereby keeping their contribution to the congestion in the fuel-nozzle area to a minimum. The usual method of supplying coal to nozzles has required rather large piping, and the addition of more large-size piping would not be welcome in the area immediately behind the fuel nozzles.

SUMMARY OF THE INVENTION

It is accordingly an object of the present invention to accomplish the functions of ignition, warm-up, and low-load stabilization with the use of a minimum of auxiliary fuel.

Accordingly, in a furnace system that includes a furnace, a main coal nozzle arranged to direct coal into the furnace, an air preheater having a flue-gas inlet, an air inlet, and an air outlet and being positioned to receive flue gases from the furnace and transfer heat from the flue gases to the air entering the air inlet and leaving the air outlet, a main pulverizer, a conduit positioned to conduct coal from the pulverizer outlet to the main coal nozzle, means for forcing a first air stream from the preheater outlet, through the pulverizer, and into the nozzle, and means for forcing a second air stream from the preheater outlet into the furnace, there is provided according to the present invention an ignitor, warm-up, and low-load-stabilization system comprising: an ignitor nozzle positioned for ignition of coal leaving the main coal nozzle, and ignitor pulverizer for pulverizing coal, a separator for separating coal from air, means for conveying coal mixed with air from the ignitor pulverizer to the separator, means for conveying coal from the separator to the ignitor nozzle, means for causing a third air stream having a temperature higher than the temperature of either the first or the second air stream to flow to the ingitor nozzle, and a lighter, positionable near the outlet of the ignitor nozzle, for igniting coal issuing from the ignitor nozzle.

BRIEF DESCRIPTION OF THE DRAWINGS

These and further features and advantages of the invention become evident in the description of the embodiment shown in the drawings attached, wherein.

DETAILED DESCRIPTION OF THE PREFERRED EMBODIMENT

Figure 1:
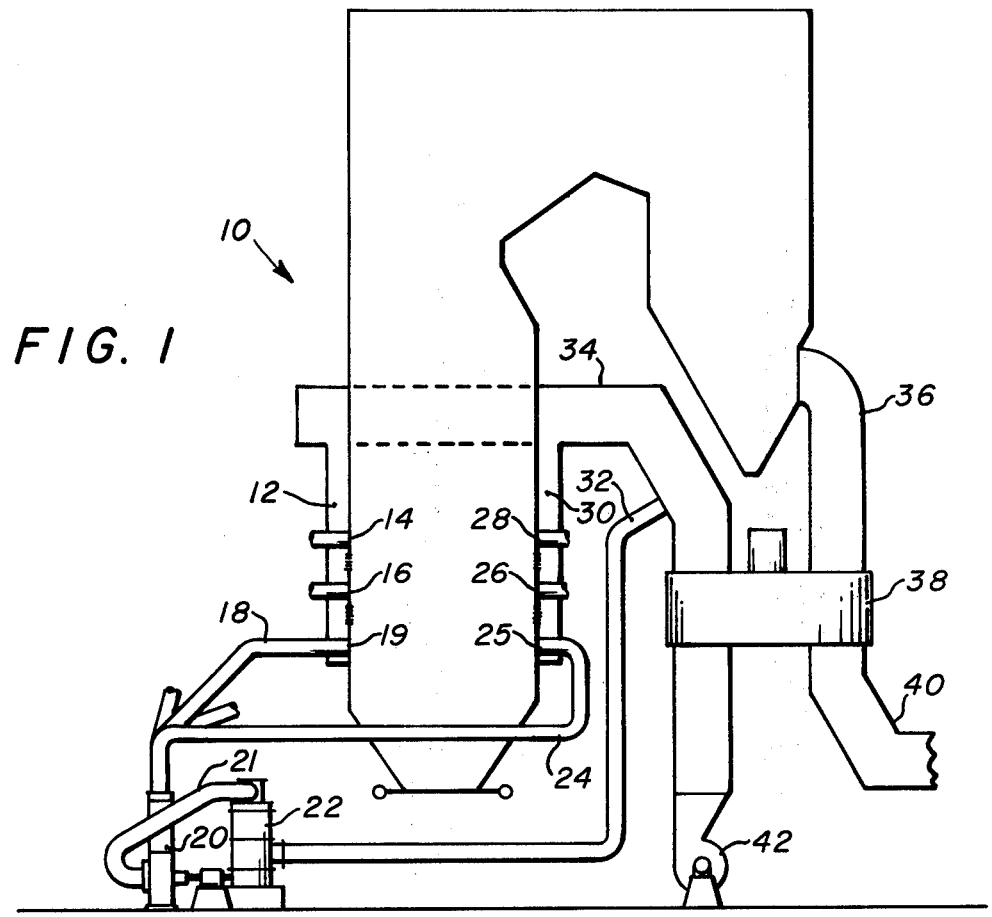
FIG. 1 is a diagrammatic view of fuel system for the load-carrying nozzles.

FIG. 1 shows the system for supplying air and fuel to the load-carrying nozzles of a pulverized-coal boiler. The furnace is generally shown at 10. A conduit 36 connects the outlet of the furnace to the flue-gas inlet of air preheater 38. Conduit 40 connects the flue-gas outlet to a stack, not shown, that releases the products of combustion to the atmosphere. A fan 42 draws from the atmosphere and blows air through the air inlet of air preheater 38. Conduit 34 connects the air outlet of air preheater 38 to windboxes 12 and 30 located on either side of the furnace. The typical furnace would actually have four windboxes, one at each corner, but, for the sake of simplicity, only two are shown. Another conduit 32 conducts air from conduit 34 to the air inlet of pulverizer 22. The outlet of pulverizer 22 is connected by conduit 21 to exhauster 20, whose outlet communicates with several conduits. Conduits 18 and 24 lead from the exhauster outlet to coal nozzles 19 and 25, which are arranged so as to direct coal fed to them into the interior of furnace 10. Nozzels 16 and 26 are fed by a second pulverizer-exhauster combination that is not shown in the drawing, while a third pulverizer-exhauster combination, also not shown, feeds nozzles 14 and 28. Again, for each pair of nozzles shown there is typically another pair of nozzles not shown that is fed by the same pulverizer.

Windboxes 12 and 30 communicate with the interior of the furnace through openings in the vicinity of the nozzles. Dampers, not shown in the drawing, control the allocation of air from the windbox among the openings.

In normal operation, coal and air enters furnace 10 through one or more elevations of nozzles. Combustion takes place in the interior of furnace 10, producing hot flue gases that flow out conduit 36, through air preheater 38, and through conduit 40 to a stack. Air preheater 38 has moving heat-exchange surfaces that alternately contact the hot flue gases and the air entering the preheater from fan 42. The surfaces thus absorb heat from the flue gases and release it to the air from fan 42. Part of the heated air leaving air preheater 38 passes through conduit 32 and into pulverizer 22. Pulverizer 22 is an apparatus for drying and crushing coal, and the hot air brought by conduit 32 is used to dry the coal. The air stream flowing in conduit 32 and pulverizer 22 also flows through conduit 21, exhauster 20, and conduits 18 and 24 to the associated nozzles. In flowing through pulverizer 22, the air stream entrains the coal that has been sufficiently pulverized and carries it to nozzles 19 and 25. Since fan 42 and exhauster 20 both provide motivating force for this motion, it can be seen that together they constitute means for forcing a first air stream from the air outlet of preheater 38, through pulverizer 22, and into either nozzle 19 or nozzle 25.

The air forced by fan 42 and exhauster 20 through pulverizer 22 is referred to as primary air and is delivered with the coal to main coal nozzles 19 and 25. However, there is not usually enough primary air to support combustion of all of the coal, so some of the air leaving air preheater 38 goes through conduit 34 to windboxes 12 and 30. Windboxes 12 and 30 supply the secondary air, the remainder of the air required to support combustion of all the coal.

It is evident that the above discussion presupposes that hot flue gases are flowing through conduit 36. Of course, at the beginning of furnace operation, the gases flowing through the conduit 36 are relatively cool. A typical coal-fired unit includes supplementary burners that burn oil or natural gas, and it is the function of these burners to operate when the gases coming through conduit 36 are relatively cool. This is because pulverized coal is relatively difficult to ignite, and stable combustion cannot be guaranteed unless significant amounts of heat energy are present in the combustion area. This heat energy that is used to start or maintain combustion comes from many sources. It could come directly by radiation from flame that is already in the furnace, by radiation from the walls of the furnace, by conduction from the generally hot gases in the furnace, or by conduction from the primary and secondary air flowing into the the furnace. In actuality, all of these sources contribute to the ignition energy, and at high-load conditions they all add up to a sufficient amount of ignition energy for stable combustion of the coal. However, in many situations the combustion of these energy sources is not sufficient to guarantee stable combustion. One of these situations is that of a cold furnace, in which there is little radiation from the furnace walls and little energy transferred to the primary and secondary air by the air preheater. In such cases the supplementary burners are used. Another situation in which supplementary burners are used is the case in which the furnace is operated at a relatively low load, when the amount of reactants burning is sufficiently low to cause a reduction in the energy derived from the various sources. In this case again, supplementary burners are used to maintain stable combustion. In the past, these supplementary burners have all burned oil or natural gas. This is a natural choice, since oil and natural gas are much easier to light than pulverized coal is.

Figure 2:
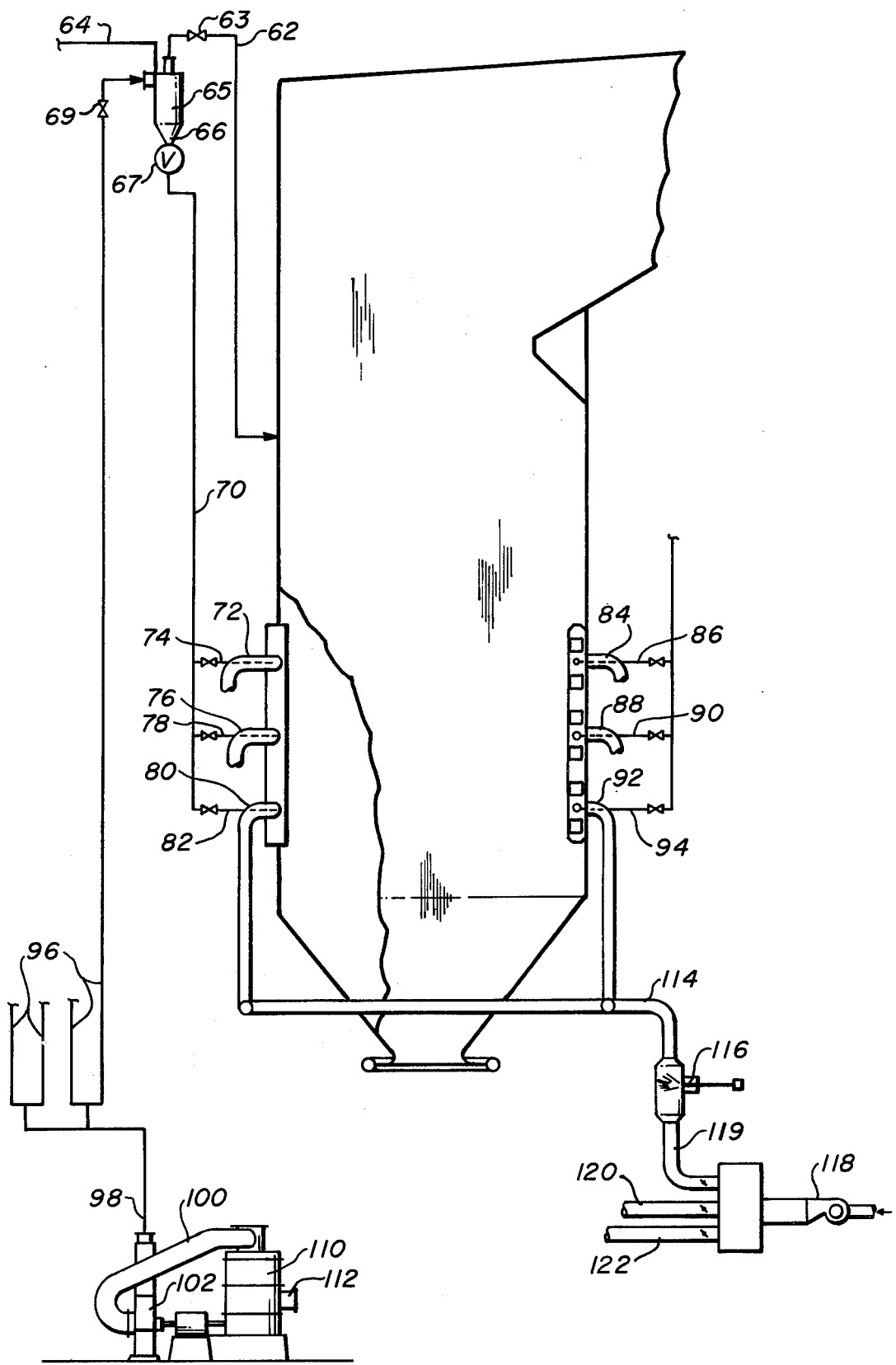
FIG. 2 is a diagrammatic view of the fuel system for the ignitor nozzle of the present invention.

FIG. 2 shows a system that enables the supplementary burners to be fired by pulverized coal. A ignitor pulverizer 110 receives air at inlet 112 from air preheater 38 of FIG. 1. Conduit 100 conducts the coal-air mixture leaving pulverizer 110 to exhauster 102, and conduit 98 connects the outlet of exhauster 102 to further conduits 96. Conduits 96 lead to cyclone separators such as separator 65. The number of such separators depends on the designer; only one is necessary, but more could be used. The outlet of separator 65 is connected by an air line 62 to a point in the interior of the furnace remote from the fuel nozzles. Bin 66 is positioned to receive the coal leaving separator 65, and the outlet of the bin is controlled by valve 67. Coal from bin 66 is fed through coal pipe 70 to approximately valved coal pipes 74, 78, and 82, each of which terminates in coal nozzles not shown in FIG. 2. Similar coal pipes 86, 90, and 94 also receive coal either from coal bin 66 or another coal bin not shown and feed it to nozzles positioned at their exits.

Those skilled in the art will recognize that it is not essential that pulverizer 110 be a separate pulverizer. The functions of pulverizer 110 and pulverizer 22 could be combined in the same pulverizer, the output being divided between a direct connection to the furnace and a connection to a separator 65. Accordingly, the main pulverizer and the ignitor pulverizer in the claims can be embodied in the same hardware.

Fan 118 draws air from the air preheater shown in FIG. 1, and this air stream is divided among conduits 119, 120 and 122. Conduit 119 feed an in-duct air heater, possibly an electric heater, and the output of air heater 116 is sent by means of conduit 114 to the ignitor nozzles at the ends of coal pipes 82 and 94. The temperature of the air leaving air heater 116 is preferably between 300° F. and 1000° F. A similar heater and similar connections exist between conduit 120 and the nozzles at the end of coal pipes 78 and 90 and between conduit 122 and the nozzles at the ends of coal pipes 74 and 86.

Figure 3:
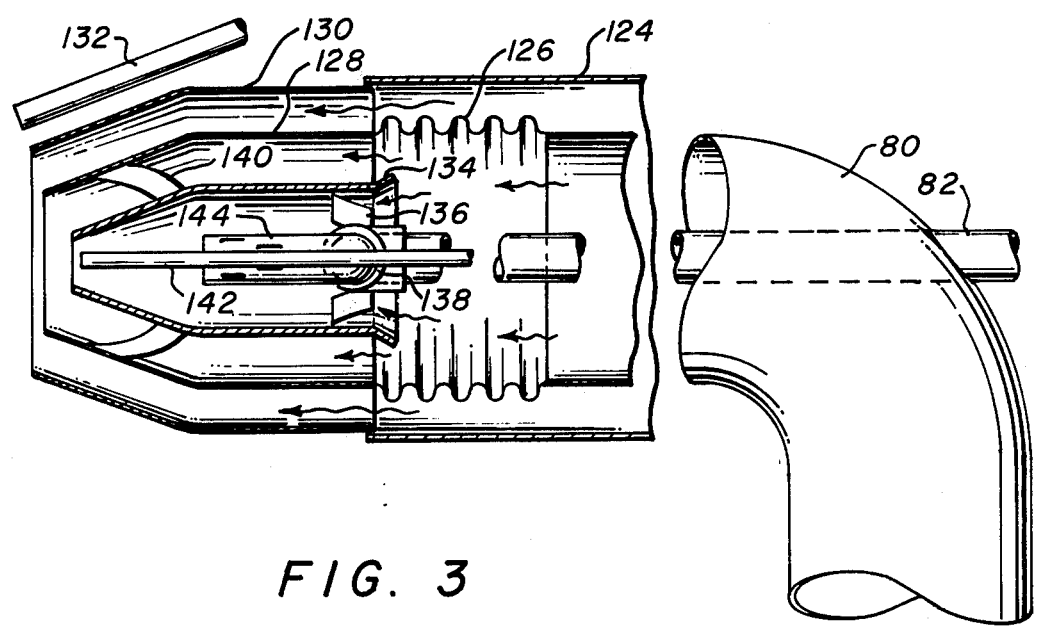
FIG. 3 is a side elevation, partly a cross section, of a typical ignitor nozzle for use with the present invention.

FIG. 3 shows an ignitor nozzle of the type that would be fed by coal pipe 82. The ignitor nozzle is actually made of three concentric nozzles 128, 130 and 134. Nozzles 128 and 134 are both fed by conduit 80, which is attached to nozzle 128 by flexible connector 126. Coal pipe 82 is connected through ball joint 138 to coal-pipe extension 144. Interior to and concentric with coal pipe 82 and coal-pipe extension 144 is lighter 142. Lighter 142 may be a small version of an ordinary coal-/or gas-fired ignitor, or it may be a high-energy arc ignitor. In either case, the ignitor is flexible at least through the area of the ball joint in order to allow it to move with coal-pipe extension 144. Air conduit 124 communicates with windbox 12 of FIG. 1 and has nozzle 130 fitted on its exit. Accordingly, nozzle 130 is in communication with windbox 12. A typical unit would have a discriminating flame detector 132 of any desired type in order to determine whether or not there is flame at the end of the ignitor nozzle.

To start up the furnace when it is cold, pulverizer 110 is started, receiving coal at its inlet and crushing it. The air inlet of pulverizer 110 receives air that has been blown through air preheater 38 by fan 42. In a cold start-up, this air is still relatively cool. The cool air is blown through pulverizer 110, conduit 100, exhauster 102, and conduits 98 and 96 to separator 65. Separator 65 removes the coal that has been entrained by the air blown through pulverizer 110, and it drops it into bin 66. Simultaneously, the air separated from the coal is exhausted into the furnace through line 62. Alternately, bin 66 could be a storage bin large enough to hold the amount of coal needed for a startup. In such a case, the pulverized coal left in bin 66 from previous operation of the furnace would fuel the operation until the furnace has heated up. Inerting line 64 is used to maintain an atmosphere in bin 66 during storage that discourages spontaneous combustion. After the furnace has heated up, ignitor pulverizer 110 starts to work, replenishing the supply of stored coal in bin 66.

Whichever method is used, coal is supplied by bin 66. Valve 67 regulates the amount of coal that is allowed to fall from bin 66, and this coal is forced by appropriate means through conduits 70 and 82 and out the ignitor nozzle. Similarly, coal is also forced through coal pipe 94 and through the nozzle fitted at its exit. Due to the fact that the coal is sent to conduits 82 and 94 with almost no air, coal pipes 82 and 94 can be made relatively small, so they do not contribute to the congestion in the furnace corners. At the same time that the coal is being delivered to the ignitor nozzles, air from preheater 38 is forced by fan 118 through conduit 119 to heater 116. Heater 116 heats the air to a temperature high enough to provide stable combustion. Without heater 116, the only heat in the air would be that imparted to it by air preheater 38, and on a cold start this is not very much heat. The hot air leaving heater 116 is fed by conduit 114 to conduits 80 and 92. Part of the air flowing through conduit 80 passes through nozzle 134 of FIG. 3. According to the present state of the art, nozzle 134 may have vanes 136 to properly direct the air flow, and this air flow imparts an appropriate flow pattern to the coal that leaves the openings of coal-pipe extension 144.

It is to be noted that the present system allows the amount of heat introduced by air heater 116 to be kept to a minimum. Since the air that is heated is used only to add to the ignition energy at the ignitor nozzle, the necessity of adding heat to the entire volume of air flowing through preheater 38 is avoided. Furthermore, since the inert water vapor that results from the drying of the coal has been separated from the coal before the coal reaches the ignitor nozzles, none of the energy supplied by air heater 116 is used up in heating inerts. The rest of the air that flows through conduit 80 is conducted through nozzle 128 and past vanes 140, which also impart a flow pattern appropriate for stable combustion. Though the amount of air heated by heater 116 will normally be kept as low as possible, system designs may provide sufficient capacity to heat 100 percent stoichiometric air if required. Thus, the amount of air supplied through nozzles 128 and 134 may be stoichiometrically sufficient for combustion of the coal. If it is not, windbox air will be introduced through nozzle 130. Even if the amount of heated air introduced through nozzles 128 and 134 is sufficient for combustion of all the coal, however, it may be desirable, depending on the characteristics of nozzles 128 and 134 and vanes 136 and 140, to introduce windbox air in order to cause a flow pattern adapted to feeding hot combustion products back into the combustion zone, thereby contributing to ignition energy and the stability of the ignitor flame.

Typically, the coal leaving coal-pipe extension 144 would have its volatiles liberated by lighter 142, and combustion of some of the coal would also be started in the presence of the air flowing through ignitor 134. The remainder of the air needed for combustion would be supplied by nozzle 128, so combustion is completed after the coal and air leaving nozzle 134 meets the air in nozzle 128. As was noted before, the air coming through conduit 80 is hot enough so that its contribution to ignition energy provides for a stable flame.

It is to be understood that the nozzle of FIG. 3 is merely illustrative; it merely shows the functions that would typically be performed by a nozzle used with the present invention.

The stable flame at the outlet of the ignitor nozzle begins to warm the furnace walls and steam pipes, and as they warm up, the flue-gas temperature increases. Eventually, the air preheater becomes hot enough for operation of the main coal nozzles, and their pulverizers are started. The coal issuing from the main coal nozzles is ignited by flame from the ignitor nozzles, and normal operation beings. If the furnace is operating at low loads, the ignitor nozzles remain on, providing low-load stabilization. It may be determined that the cost penalty in leaving the ignitors in operation is minor, so they may be left operating even at high loads.

While the invention has been described in terms of a specific embodiment, the use of a specific embodiment is by no means meant as a limitation. Accordingly, any modification within the scope of the appended claims that is apparent to those skilled in the art in light of the foregoing description is meant to be included in the invention.

What is claimed is:

1. In a furnace system that includes a furnace, a main coal nozzle arranged to direct coal into the furnace, an air preheater having a flue-gas inlet, an air inlet, and an air outlet and being connected to receive flue gases from the furnace at its flue-gas inlet and transfer heat from the flue gas to air entering the air inlet and leaving the air outlet, a main pulverizer, conduit means connected to conduct coal from the pulverizer outlet to the main coal nozzle, means for forcing a first air stream through the preheater from its air inlet to its air outlet and from the air outlet through the pulverizer and into the main coal nozzle, and means for forcing a second air stream from the preheater outlet into the furnace, the improvement comprising:
   a. an ignitor nozzle positioned for ignition of coal leaving the coal nozzle;
   b. an ignitor pulverizer for pulverizing coal;
   c. a separator for separating coal from air;
   d. means for conveying coal mixed with air from the ignitor pulverizer to the separator;
   e. means for conveying coal from the separator to the ignitor nozzle;
   f. means for heating a third air stream to a temperature higher than that of the first and second air streams;
   g. means for causing the third air stream to flow to the furnace at the ignitor nozzle; and
   h. a lighter, positionable near the outlet of the ignitor nozzle, for igniting coal issuing from the ignitor nozzle.

2. An apparatus as recited in claim 1, wherein the means for conveying coal comprises a bin connected to receive coal from the separator and to supply coal to the ignitor nozzle, for storing coal separated from air by the separator.

3. An apparatus as recited in claim 1 wherein the lighter is an arc ignitor.

4. An apparatus as recited in claim 3 wherein the means for conveying coal comprises a bin connected to receive coal from the separator and to supply coal to the ignitor nozzle, for storing coal separated from air by the separator.

5. An apparatus as recited in claim 4 wherein the means for heating a third air stream is a means for heating a third air stream to a temperature between 300° and 1000° F.

6. In a method of operating a coal-fired furnace that includes heating a first air stream by transferring heat from combustion products of the furnace to the air in the first air stream, using the first air stream to entrain coal ground in a main pulverizer and convey it to the furnace, heating a second air stream by transferring heat from combustion products of the furnace to the air in the second air stream, and conducting it to the furnace, the improvement comprising steps of:
   a. separating pulverized coal from a mixture of pulverized coal and air;
   b. supplying the separated coal to an ignitor nozzle positioned to ignite the coal entrained in the first air stream as it enters the furnace;
   c. heating a third air stream to a temperature higher than the temperature of both the first and second air streams;
   d. causing the third air stream to flow to the furnace at the ignitor nozzle; and
   e. igniting the coal leaving the ignitor nozzle.

7. A method as recited in claim 6 wherein the igniting step comprises causing an electric spark to occur near the outlet of the ignitor nozzle.

8. A method as recited in claim 6 further comprising the step of storing the separated coal until it is supplied to the ignitor nozzle.

9. A method as recited in claim 8 wherein the igniting step comprises causing an electric spark to occur near the outlet of the ignitor nozzle.

10. A method as recited in claim 9 wherein the step of heating a third air stream comprises heating a third air stream to a temperature between 300° and 1000° F.

11. In a furnace system that includes a furnace, a main coal nozzle arranged to direct coal into the furnace, an air preheater having a flue-gas inlet, an air inlet, and an air outlet and being connected to receive flue gases from the furnace at its flue-gas inlet and transfer heat from the flue gas to air entering the air inlet and leaving the air outlet, a main pulverizer, conduit means connected to conduct coal from the pulverizer outlet to the main coal nozzle, means for forcing a first air stream through the preheater from its air inlet to its air outlet and from the air outlet through the pulverizer and into the main coal nozzle, and means for forcing a second air stream from the preheater outlet into the furnace, the improvement comprising:
   a. an ignitor nozzle positioned for ignition of coal leaving the coal nozzle;
   b. an ignitor pulverizer for pulverizing coal;
   c. a separator for separating coal from air;
   d. means for conveying coal mixed with air from the ignitor pulverizer to the separator;
   e. means for conveying coal from the separator to the ignitor nozzle;
   f. means for transferring heat to a third air stream from a source other than the combustion products;
   g. means for causing the third air stream to flow into the furnace at the ignitor nozzle; and
   h. a lighter, positionable near the outlet of the ignitor nozzle, for igniting coal issuing from the ignitor nozzle.

12. An apparatus as recited in claim 11, wherein the means for conveying coal comprises a bin, connected to receive coal from the separator and to supply coal to the ignitor nozzle, for storing coal separated from air by the separator.

13. An apparatus as recited in claim 12, wherein the lighter is an arc ignitor.

14. An apparatus as recited in claim 13, wherein the means for conveying coal comprises a bin, connected to receive coal from the separator and to supply coal to the ignitor nozzle, for storing coal separated from air by the separator.

15. An apparatus as recited in claim 14, wherein the means for heating a third air stream is a means for heating a third air stream to a temperature between 300° and 1000° F.

16. In the method of operating a coal-fired furnace that includes the steps of pulverizing coal, supplying the pulverized coal to the furnace through a main coal nozzle, supplying air to the furnace at the main coal nozzle to support combustion of the coal in the furnace, igniting the coal in the furnace, thereby producing combustion products, and using heat from the combustion products to heat the air supplied to the furnace, the improvement wherein the igniting step comprises the steps of:
   a. providing a bin of pulverized coal;
   b. supplying coal from the bin to the furnace through an ignitor nozzle positioned for ignition of coal issuing from the main coal nozzle;
   c. heating an ignitor-air stream from a source other than the combustion products;
   d. supplying the ignitor-air stream to the furnace at the ignitor nozzle; and
   e. igniting the coal issuing from the ignitor nozzle, thereby providing an ignitor flame by which coal is ignited when it issues from the main coal nozzle.

17. A method as recited in claim 16, wherein the step of igniting the coal issuing from the ignitor nozzle comprises causing an electric spark to occur near the outlet of the ignitor nozzle.

18. A method as recited in claim 16 further comprising the step of storing the separated coal until it is supplied to the ignitor nozzle.

19. A method as recited in claim 18 wherein the igniting step comprises causing an electric spark to occur near the outlet of the ignitor nozzle.

20. A method as recited in claim 19 wherein the step of heating a third air stream comprises heating a third air stream to a temperature between 300° F. and 1000° F.

21. A method of igniting a fuel stream comprising pulverized coal in an unheated furnace pursuant to initiating operation of the furnace comprising the steps of:
    providing a supply of pulverized coal;
    establishing a stream of primary air;
    establishing a second air stream;
    energizing a source of thermal energy located exteriorly of the unheated furnace;
    heating the second air stream by transferring thermal energy thereto from the source of thermal energy, the second air stream thereby being heated with thermal energy which is not directly derived from furnace operation to a temperature substantially higher than that of the primary air;
    entraining coal from the supply in the primary air stream to form a fuel stream;
    simultaneously delivering the fuel stream and at least a part of the heated second air stream to the interior of the furnace via a nozzle associated with a burner;
    delivering additional hot air from the heated second air stream to the furnace at the nozzle and coaxially about the simultaneously delivered fuel stream and first part of the heated air whereby the additional hot air supports combustion of the fuel stream; and
    supplying ignition energy to the fuel stream at the nozzle to cause ignition thereof in the cold furnace to thereby initiate operation of the furnace.

22. The method of claim 21 further comprising the step of:
    delivering additional hot air from the heated second air stream to the furnace at the nozzle and coaxially about the simultaneously delivered fuel stream and heated air whereby the additional hot air supports combustion of the fuel stream.

23. The method of claim 21 wherein the step of providing a supply of pulverized coal comprises:
    pulverizing coal during normal operation of the furnace;
    diverting some of the pulverized coal to an air separator to remove transport air therefrom;
    loading the pulverized coal into a storage bin; and
    controllably withdrawing pulverized coal from the storage bin.

24. The method of claim 21 further comprising:
    pulverizing coal subsequent to ignition of the fuel stream and warming up of the furnace;
    heating the air which subsequently forms the primary air stream by heat exchange with furnace combustion products;
    supplying the pulverized coal to the furnace by means of entrainment in the heated primary air; and
    discontinuing heating of the second air stream upon initiation of pulverizing.

25. The method of claim 24 wherein the step of providing a supply of pulverized coal comprises:
    pulverizing coal during normal operation of the furnace;
    diverting some of the pulverized coal to an air separator to remove transport air therefrom; and
    loading the pulverized coal into a storage bin.

26. In a furnace system that includes a furnace, at least a first main coal nozzle arranged to direct coal into the furnace, an air preheater having a flue-gas inlet, an air inlet, and an air outlet and being connected to receive flue gases from the furnace at its flue-gas inlet and transfer heat from the flue gas to air entering the air inlet and leaving the air outlet, a coal pulverizer, conduit means connected to conduct pulverized coal from the pulverizer to the main coal nozzle, means for forcing a first air stream through the preheater from its air inlet to its air outlet and from the air outlet through the pulverizer to entrain and transport coal through said conduit means and into the main coal nozzle, an improved warm-up system comprising:
    an ignitor nozzle;
    means for storing a supply of pulverized coal during normal furnace operation;
    means for establishing a second air stream;
    means for controllably releasing pulverized coal from said storing means;
    means for transferring heat to the second air stream from a source other than the furnace flue gas;
    means for causing the second air stream and the coal released from said storing means to flow into the furnace at the ignitor nozzle; and
    a lighter, positionable near the outlet of the ignitor nozzle, for igniting coal issuing from the ignitor nozzle whereby ignition energy will be supplied by said lighter and heat transfer means.

* * * * *